United States Patent [19]

Dutcher

[11] Patent Number: 4,508,526

[45] Date of Patent: Apr. 2, 1985

[54] 3-D GLASSES AND METHOD FOR PRODUCING SAME

[75] Inventor: Daniel P. Dutcher, White Bear Lake, Minn.

[73] Assignee: Champion International Corporation, Stamford, Conn.

[21] Appl. No.: 458,168

[22] Filed: Jan. 14, 1983

[51] Int. Cl.³ .............................................. B05B 1/14
[52] U.S. Cl. .................................... 493/346; 493/959; 493/362; 493/381; 351/47; 351/49; 156/108; 156/298
[58] Field of Search ............... 493/959, 346, 361, 362, 493/354, 381; 351/44, 45, 46, 47, 49; 156/73.3, 156/108, 298, 250; 29/412, 415, 417

[56] References Cited

U.S. PATENT DOCUMENTS

| | | | |
|---|---|---|---|
| 2,511,303 | 6/1950 | Stevens et al. | 156/108 |
| 3,536,555 | 12/1967 | Thompson, Jr. | 156/108 |
| 3,811,977 | 5/1974 | Kramer | 156/108 |
| 4,018,515 | 4/1977 | Derkas | 351/49 |

OTHER PUBLICATIONS

"3 D Viewing Comfort Its Magic", 12/1953, Depth-Viewers, Inc., vol. 28, No. 12, p. 3.

*Primary Examiner*—Daniel C. Crane
*Assistant Examiner*—David B. Jones
*Attorney, Agent, or Firm*—Evelyn M. Sommer

[57] ABSTRACT

A plurality of 3-D glasses are produced by cutting a sheet of material to provide first and second parallel series of eyeglass cutouts therein, each of the series of eyeglass cutouts including first and second eye cutouts, first and second ear cutouts and nose cutouts arranged in respective columns. Continuous strips of red and blue film are placed along preselected columns of eye cutouts. In accordance with a first embodiment, the eyeglass cutouts are separated from one another to provide one ply 3-D glasses. In accordance with a second embodiment, the sheet of material is folded to produce a single series of two ply eyeglass cutouts.

9 Claims, 10 Drawing Figures

3-D GLASSES AND METHOD FOR PRODUCING SAME

BACKGROUND OF THE INVENTION

The present invention is directed to the field of paper processing, and more particularly to a technique for producing 3-D glasses from paperboard.

It has long been known that a three dimensional effect may be reconstructed from a two dimensional projection by providing two different perspectives of the projection along with some means for the viewer to discriminate between the two perspectives. With specific regard to 3-D motion pictures, for example, the film is prepared by simultaneously shooting the desired object from two lenses angularly separated to simulate binocular vision, the perspectives of the left and right lenses corresponding to the perspectives of the left and right eyes. The information received by the left and right lenses must remain distinct on the film so that the associated left and right eye information can later be separated by the viewer. A conventional technique for providing this separation is to provide blue and red filters for the left and right lenses of the camera. To view a film recorded in this manner, blue and red filters are placed over the viewer's left and right eyes, and the left and right eye information will be reconstructed for the viewer, thus simulating a three dimensional image. For this purpose, "3-D glasses" made from paperboard or cardboard and red and blue cellophane film, have become widely used. The glasses are relatively inexpensive to make and can either be reused or disgarded after use. The demand for such glasses has recently experienced a dramatic increase in view of the resurgence of 3-D movies at theaters, and the emergence of 3-D broadcasting over commercial television stations.

The prior art technique for producing 3-D glasses has been to process each set of glasses substantially individually. That is, the glasses have heretofore been individually produced in series from a long strip of paper, thus raising production costs. Also, buckling of the prior art eyeglass frames at the intersection of the front face of the glasses and the temples has been experienced during folding.

OBJECTS AND SUMMARY OF THE INVENTION

It is therefore an object of the invention to improve the above-described prior art technique for producing 3-D glasses.

It is a further object of the invention to provide a rapid and efficient technique for producing 3-D glasses.

It is a further object of the invention to provide a more economical technique for producing 3-D glasses.

It is a further object of the invention to provide 3-D glasses which do not buckle when folded.

It is a further object of the invention to provide 3-D glasses of new and more economical construction than the prior art glasses.

In accordance with the first embodiment of the invention, a process for producing a plurality of eyeglasses comprises the steps of cutting a sheet of material to provide at least one series of eyeglass cutouts therein, attaching film to the eyeglass cutouts and separating the eyeglass cutouts from one another. The series of eyeglass cutouts include left and right eye cutouts, left and right ear cutouts and nose cutouts arranged in respective columns. A continuous strip of red film is adhesively attached to one of the left and right eye columns and a continuous strip of blue film is adhesively attached to the other of the left and right eye columns. The steps of cutting, attaching and separating are performed simultaneously at different parts of the sheet of material.

The step of cutting may comprise cutting the sheet of material to provide at least first and second of the series of eyeglass cutouts, the first and second series being adjacent and contiguous. The eyeglass cutouts in each of the series may be oriented top side up, or alternately oriented top side up and bottom side up. The step of cutting may comprise cutting a sheet of cardboard, paperboard, or the like.

In accordance with the second embodiment, a process for producing a plurality of 3-D eyeglasses comprises the steps of cutting a sheet of material, placing a continuous strip of red film on the material, placing a continuous strip of blue film on the material, folding the sheet of material and separating the eyeglass cutouts. The sheet of material is cut to provide first and second parallel series of eyeglass cutouts therein. Each of the series of eyeglass cutouts comprises first and second eye cutouts, first and second ear cutouts and nose cutouts, arranged in respective columns. The continuous strip of red film is placed on one of the columns formed by the first and second eye cutouts in one of the first and second series. The strip of blue film is placed on another of the columns formed by the first and second eye cutouts in one of the first and second series. The sheet of material is folded such that the first and second eye, first and second ear, and nose cutouts in the first series are respectively aligned with the second and first eye, second and first ear, and nose cutouts in the second series, to thus form a single series of eyeglass cutouts.

The second embodiment may further include the steps of perforating the sheet of material and scoring the sheet of material. The sheet of material is perforated between the first ear and first eye cutouts and between the second ear and second eye cutouts on one of the first and second series of eyeglass cutouts. The sheet of material is scored between the first ear and first eye cutouts and between the second ear and second eye cutouts on the other of the first and second series of eyeglass cutouts. The process may further include the steps of gluing the strips of red and blue film to their respective columns and scoring the sheet of material between the first and second series to thus facilitate the step of folding the sheet of material. The process may still further include the step of gluing the first and second series together.

The present invention is also directed to 3-D eyeglasses produced in accordance with the above-described processes.

DETAILED DESCRIPTION OF THE INVENTION

Figure 1:
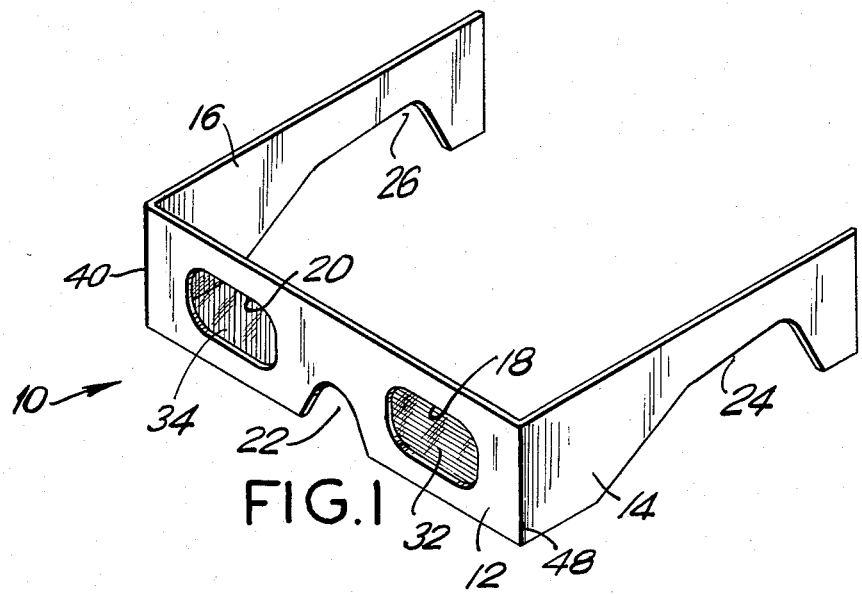
FIG. 1 is a perspective view of the 3-D glasses produced in accordance with the first embodiment of the present invention.

The 3-D glasses produced in accordance with the first embodiment of the present invention are shown in perspective in FIG. 1. The glasses 10 are comprised of front face 12 and left and right temples 14 and 16, respectively. The front face 12 is provided with left and right eye cutouts 18 and 20, respectively, and nose cutout 22. The temples 14 and 16 each are provided with respective ear cutouts 24 and 26. The front face 12 and temples 14 and 16 are made from a single unitary piece of a generally stiff paperboard, cardboard or the like. The temples 14 and 16 are connected to the front face 12 by means of score lines 48.

The left and right eye cutouts 18 and 20 are covered with a colored cellophane film to thus allow the user to discriminate the images produced by the left and right lenses of the recording camera. Specifically, the left eye cutout 18 is covered with a blue cellophane film 32 while the right eye cutout 20 is covered with a red cellophane film 34. However, it will be appreciated by those skilled in the art that the use of the blue film for the left eye and red film for the right eye is only a matter of convention, and that use will be reversed if the recording process is similarly reversed. Further, the choice of the colors red and blue, although probably optimal, is also a matter of convention and the colors of the film employed may depart therefrom whenever the colors employed during recording are changed.

Figure 2A:
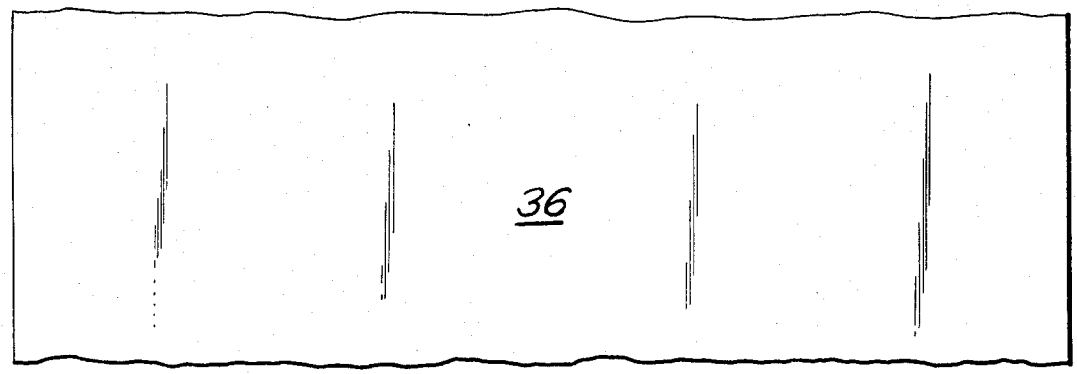
FIGS. 2A–2E illustrate the step-by-step technique for producing 3-D glasses in accordance with the first embodiment of the present invention.

In accordance with the first embodiment, the blue and red films 32 and 34 are not sandwiched between two layers of paperboard, thus lending itself to rapid and efficient processing. This technique will now be described with reference to FIGS. 2A-2E. As shown in FIG. 2A, a continuous sheet of paper 36 is provided and is preferably of a fairly stiff paperboard, or the like. Although separate sheets are illustrated from figure to figure, such is only for the sake of convenience. In practicing the present invention, a single continuous sheet of paper 36 will be provided such that all of the process steps illustrated in FIGS. 2A-2E (and 4A-4B) may be practiced substantially simultaneously at different positions along the single sheet, as the sheet moves down the line.

Figure 2B:
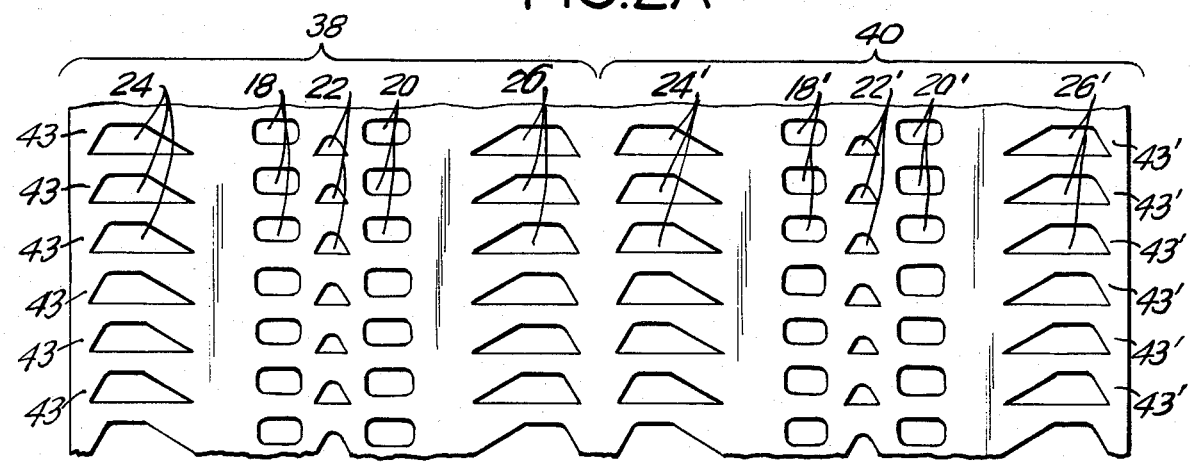

As the process continues, the sheet is cut as generally illustrated in FIG. 2B through the use of a dye, punch, or other suitable means, to produce first and second series 38 and 40 of eyeglass cutouts 43 and 43' in parallel on the left and right halves of sheet 36. Each of the eyeglass cutouts 43 and 43' in its respective series 38 and 40 is vertically contiguous with the adjacent eyeglass cutout, and each eyeglass cutout is arranged top up as shown. The eyeglass cutouts 43 are provided with the eye cutouts 18 and 20, the nose cutouts 22 and the ear cutouts 24 and 26, while the eyeglass cutouts 43' are likewise provided with cutouts 18'-26'.

Figure 2C:
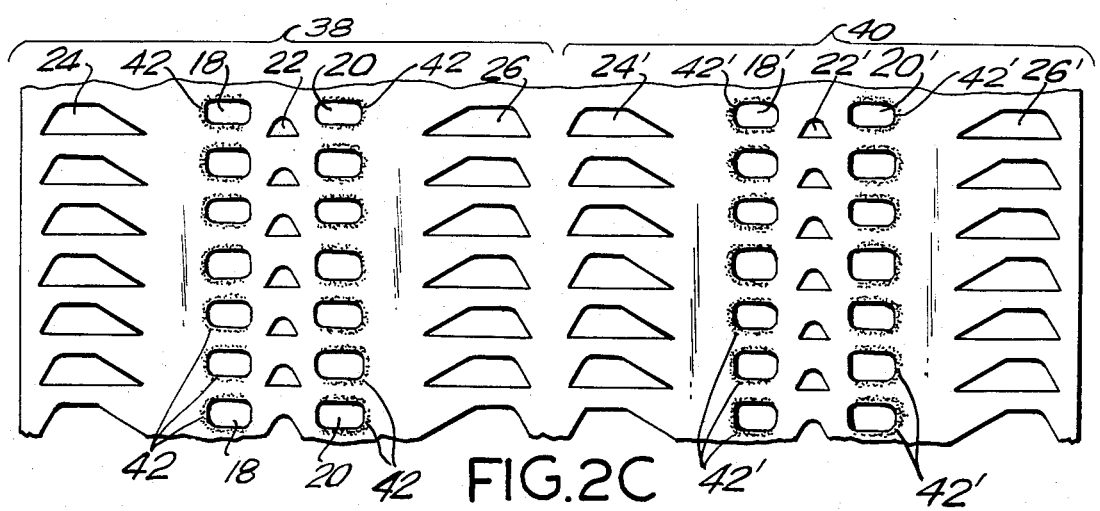
Figure 2D:
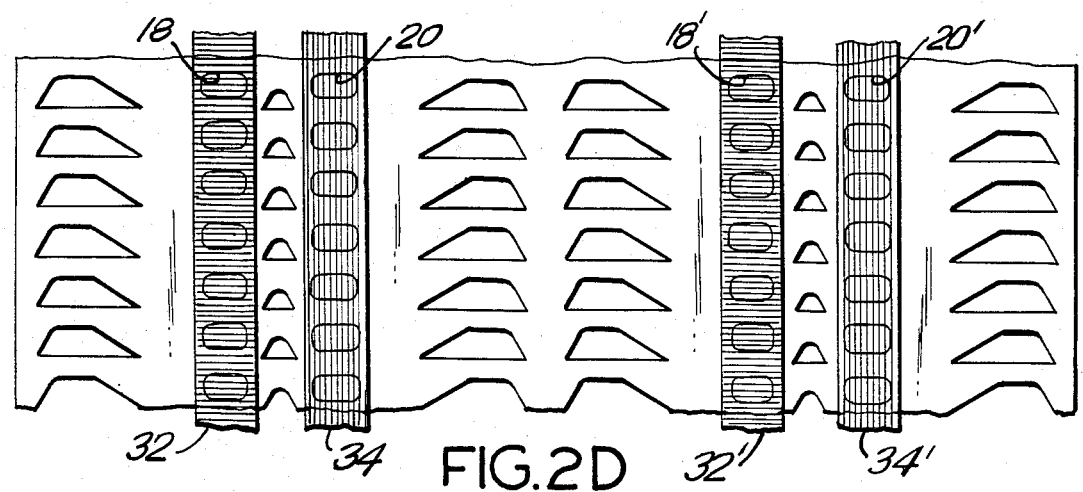

As the sheet moves down the line, glue 42 is applied to preselected portions of the sheet around the eye cutouts 18, 18', 20 and 20', as shown in FIG. 2C. Next, as shown in FIG. 2D, the left and right eye cutouts 18 and 20 in the first series 38 are windowed with respective and continuous blue and red films 32 and 34, while the left and right eye cutouts 18' and 20' in the second series 40 are windowed with continuous blue and red films 32' and 34', respectively.

Figure 2E:
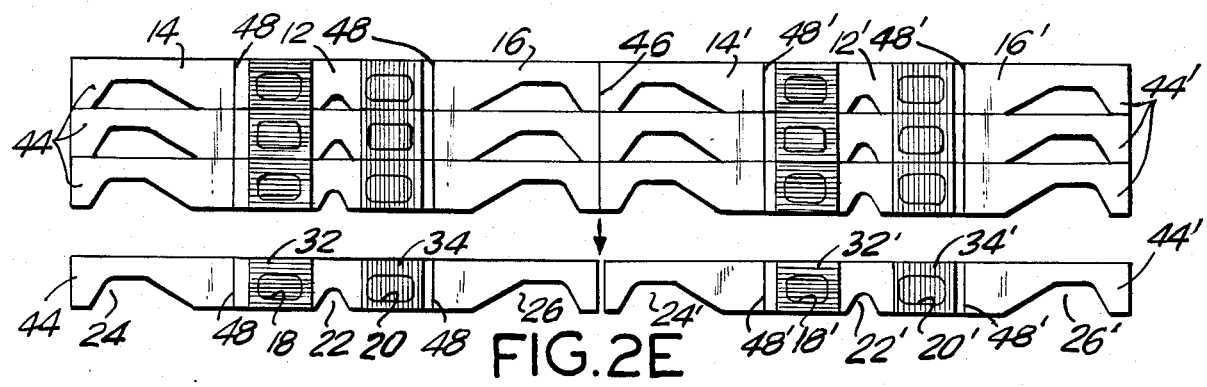

The continuous sheet may then be cut or slit at the next station as illustrated in FIG. 2E to produce a plurality of 3-D eyeglasses 44 from the first series 38, and a plurality of 3-D eyeglasses 44' from the second series 40. The glasses are preferably scored along the borders 48 between the front faces and temples of the glasses, either contemporaneously with the cutting or slitting operation, or at some other convenient time, as desired. The eyeglasses 10 illustrated in FIG. 1 are finally produced by folding the temples 14 and 16 of the eyeglasses 44 along the score lines 48. The eyeglasses 10 can also be produced by the eyeglasses 44' in the second series as well by similarly folding along the score lines.

Although the first embodiment of the invention has been described as providing two parallel series 38 and 40 of 3-D glasses, those skilled in the art will appreciate that other numbers of parallel groups could be employed, such as three, four or more. On the other hand, a single series of glasses could be produced if desired.

Figure 3:
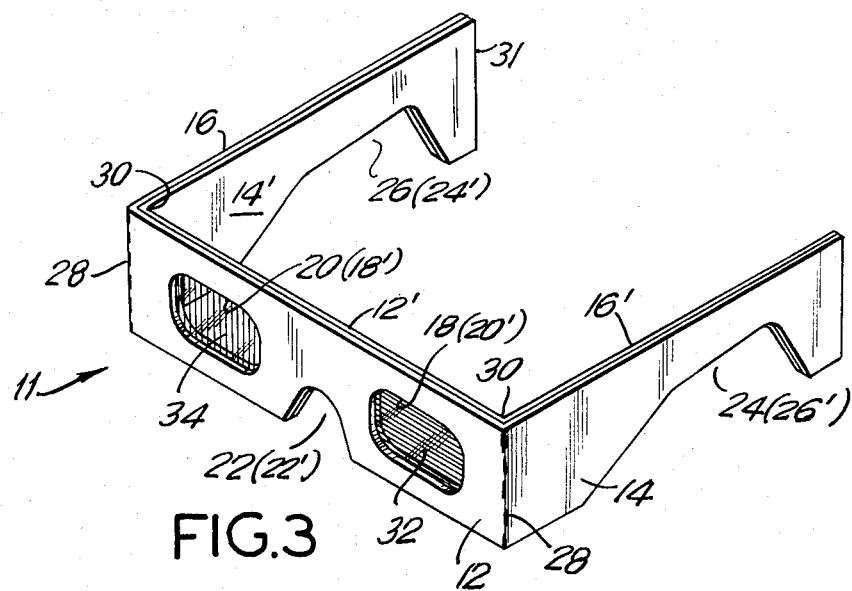
FIG. 3 is a perspective view of the 3-D glasses produced in accordance with the second embodiment of the present invention.

The second embodiment of the invention will now be described with reference to FIGS. 3-4B. With particular reference to FIG. 3, the 3-D glasses 11 in accordance with the second embodiment are produced from two layers of the paperboard. The right temple is comprised of temple portions 16 and 14', and the left temple is comprised of temple portions 14 and 16', temple portions 14' and 16' lying on the interior of the right and left temples. The right temple portions 16 and 14' are provided with respective ear cutouts 26 and 24' and the left temple portions 14 and 16' are provided with respective ear cutouts 24 and 26'. The temple portions 14 and 16 are attached to the front face 12 by means of perforations 28, while temple portions 14' and 16' are attached to the rear face 12' by means of score lines 30. The front and rear faces 12 and 12' are respectively provided with left eye cutouts 18 and 20', right eye cutouts 20 and 18' and first and second nose cutouts 22 and 22'. The blue and red films 32 and 34 are sandwiched between the front and rear faces 12 and 12', respectively.

Figure 4A:
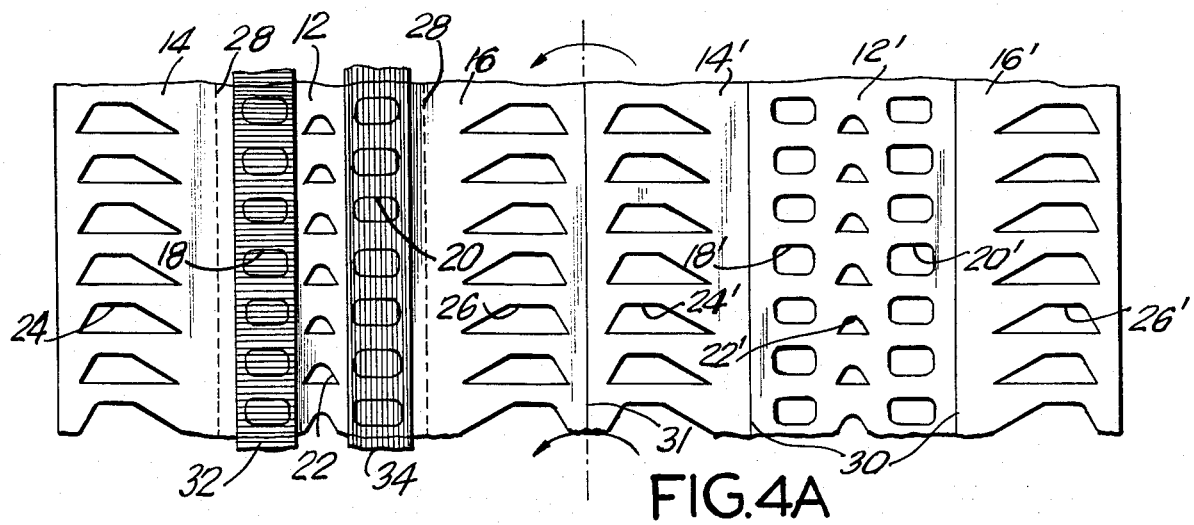
FIGS. 4A and 4B illustrate the technique for producing the 3-D glasses in accordance with the second embodiment of the present invention.

The manner in which the 3-D glasses 11 in accordance with the second embodiment are produced will now be described with reference to FIGS. 4A and 4B. As with the first embodiment, a continuous sheet of stiff paperboard, or the like is cut with a dye, punch or other suitable means to produce the blank generally illustated in FIG. 2B. Unlike the first embodiment, however, a single strip of blue cellophane film 32 and a single strip of red cellophane film 34 are glued over single columns of left eye cutouts 18 and right eye cutouts 20, respectively, as shown in FIG. 4. Also provided between the front face 12 and temples 14 and 16 are a pair of perforation lines 28. Provided between the rear face 12' and the temples 14' and 16' are a pair of score lines 30. Finally, a score line 31 is provided between the temples 16 and 14'.

Figure 4B:
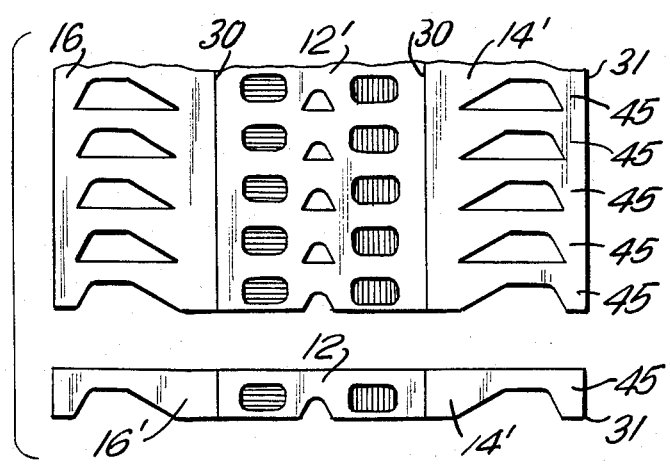

After securing the films 32 and 34 to the columns of eye cutouts and providing the perforations 28 and score lines 30 and 31, the blank may be folded about score line 31 to produce a single column of double ply glasses 45, as illustrated in FIG. 4B. Eye cutouts 18 are thus aligned with cutouts 20', as are eye cutouts 20 and 18', ear cutouts 24 and 26', ear cutouts 26 and 24' and nose cutouts 22 and 22'. The films 32 and 34 are sandwiched between the front and faces 12 and 12', and each of the temples is provided by a double layer of paperboard. The two layers of paperboard are glued together in a routine manner, and the glasses are separated by cutting, slitting or the like as shown in FIG. 4B, to produce the completed glasses.

Those skilled in the art will appreciate that the glasses produced in accordance with the second embodiment are more rugged and durable than those produced in accordance with the first embodiment. However, the glasses produced in accordance with the second embodiment will be more expensive to manufacture.

By providing the perforations 28 on the front of the glasses, and the score lines 30 behind the perforations 28, the glasses will not warp or buckle when folded, since the perforations 28 are weaker than the score lines 30, thus stretching about the stronger score lines.

Those skilled in the art will also appreciate that the blue and red films 32 and 34 can selectively be applied to the rear face 12' rather than the front face 12, as illustrated in FIG. 4, if desired. Further, one of the films can be applied to the front face 12 and the other of the films applied to the rear face 12' if desired.

Figure 5:
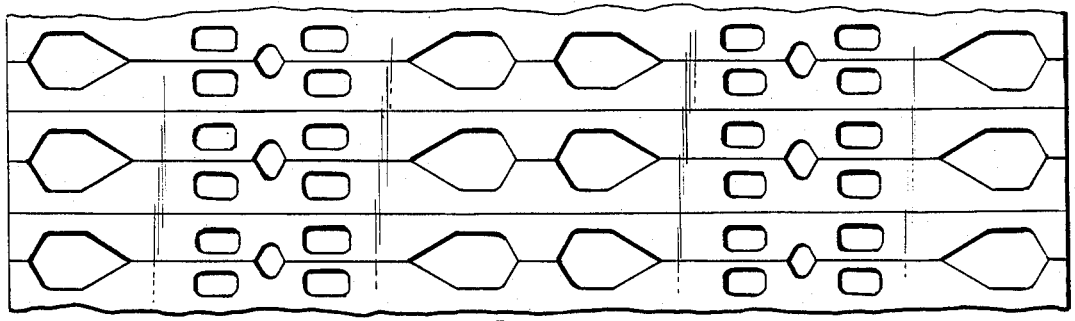
FIG. 5 illustrates an alternative technique for producing the eyeglass cutouts.

Both the first and second embodiments can further be modified by producing the blank illustrated in FIG. 5, wherein the eyeglass cutouts are alternately disposed upside down to produce an alternating series of right side up and upside down pairs, respectively, to thus effectively double the size of the nose and ear cutouts, while reducing the numbers thereof by half.

Thus, the present invention provides a rapid, efficient and inexpensive technique for producing 3-D glasses. Although the present invention has been described with reference to the foregoing specification and claims, many additions, deletions and modifications to the abovedescribed invention may be made without departing form the spirit and scope thereof. The scope of the invention will be defined by the following claims.

What is claimed is:

1. A process for producing a plurality of 3-D eyeglasses comprising:

cutting a sheet of material to provide at least one series of eyeglass cutouts therein, said series of eyeglass cutouts comprising a column of first ear cutouts, a column of first eye cutouts, a column of nose cutouts, a column of second eye cutouts and a column of second ear cutouts consecutively arranged in parallel columns, each said eyeglass cutout having opposed top and bottom sides, with said eyeglass cutouts in said series being alternately oriented such that the top side of each said eyeglass cutout is adjacent the top side of one said eyeglass cutout adjacent thereto and such that the bottom side of each said eyeglass cutout is adjacent the bottom side of one said eyeglass cutout adjacent thereto;

adhesively attaching a continuous strip of red film to the column of first eye cutouts and adhesively attaching a continuous strip of blue film to the column of second eye cutouts; and separating the eyeglass cutouts from one another along lines extending generally perpendicular to said columns and intermediate adjacent eyeglass cutouts in said series.

2. The process of claim 1 wherein said step of cutting comprises cutting the sheet of material to provide at least first and second of said series eyeglass cutouts, said first and second series being adjacent and continguous, such that the columns in said first series are generally parallel to the columns in the second series.

3. The process of claim 1 wherein said step of cutting comprises cutting a sheet of cardboard, paperboard, or the like.

4. The process of claim 1 wherein the sheet of material defines and elongated sheet of material and wherein the process is continuous such that the steps of cutting, attaching and separating are performed sequentially on each said eyeglass cutout in said series, but wherein said steps of cutting, attaching and separating are performed simultaneously at different eyeglass cutouts along said sheet of material.

5. A process for producing a plurality of 3-D eyeglasses comprising:

cutting a sheet of material to provide first and second parallel series of eyeglass cutouts therein, each of said series of eyeglass cutouts comprising a column of first ear cutouts, a column of first eye cutouts, a column of nose cutouts, a column of second eye cutouts and a column of second ear cutouts consecutively arranged in parallel relationship;

placing a continuous strip of red film on the column of first eye cutouts in said first series;

placing a continuous strip of blue film on the column of second eye cutouts in said first series;

folding said sheet of material such that the columns of first ear cutouts, first eye cutouts, nose cutouts, second eye cutouts, and second ear cutouts in said first series are respectively aligned with the corresponding columns of cutouts in said second series, to thus form a single series of eyeglass cutouts; and separating the eyeglass cutouts in the single series from one another along lines extending generally perpendicular to said columns.

6. A process for producing a plurality of 3-D eyeglasses comprising:

cutting a sheet of material to provide first and second parallel series of eyeglass cutouts therein, each of said series of eyeglass cutouts comprising a column of first ear cutouts, a column of first eye cutouts, a column of nose cutouts, a column of second eye cutouts and a column of second ear cutouts consecutively arranged in parallel relationship;

perforating the sheet of material between the first ear and first eye cutouts and between the second ear and second eye cutouts on one of said first and second series of eyeglass cutouts;

scoring the sheet of material between the first ear and first eye cutouts and between the second ear and second eye cutouts on the other of said first and second series of eyeglass cutouts;

placing a continuous strip red film on the column of first eye cutouts in said first series;

placing a continuous strip blue film on the column of second eye cutouts in said first series;

folding said sheet of material such that the columns of first ear cutouts, first eye cutouts, nose cutouts, second eye cutouts, and second ear cutouts in said first series are respectively aligned with the corresponding columns of cutouts in said second series, to thus form a single series of eyeglass cutouts; and separating the eyeglass cutouts in the single series from one another.

7. The process of claim 6 further comprising scoring the sheet of material between the first and second series to thus facilitate the step of folding the sheet of material.

8. The process of claim 6 further comprising gluing the strips of red and blue film to their respective columns.

9. The process of claim 8 further comprising gluing the first and second series together.

* * * * *